United States Patent [19]

Cronson et al.

[11] 4,254,418
[45] Mar. 3, 1981

[54] COLLISION AVOIDANCE SYSTEM USING SHORT PULSE SIGNAL REFLECTOMETRY

[75] Inventors: Harry M. Cronson; Gerald F. Ross; Basrur R. Rao, all of Lexington, Mass.; Werner Lerchenmueller, Bellevue; Prentis B. Drew, Kirkland, both of Wash.

[73] Assignee: Sperry Corporation, New York, N.Y.

[21] Appl. No.: 936,440

[22] Filed: Aug. 23, 1978

[51] Int. Cl.³ .............................................. G01S 3/02
[52] U.S. Cl. ............................. 343/112 CA; 340/47
[58] Field of Search ................ 343/112 CA, 112 D; 340/23, 47, 48

[56] References Cited

U.S. PATENT DOCUMENTS

| 2,685,068 | 7/1954 | Goubau | 343/100 R |
|---|---|---|---|
| 2,702,342 | 2/1955 | Korman | 343/112 CA |
| 3,377,587 | 4/1968 | Nakahara et al. | 343/8 |
| 3,392,388 | 7/1968 | Nakahara et al. | 343/6.5 SS |
| 3,408,646 | 10/1968 | Simon et al. | 343/6.5 SS |

Primary Examiner—Theodore M. Blum
Attorney, Agent, or Firm—Howard P. Terry; Seymour Levine

[57] ABSTRACT

A collision avoidance system for rapid transit vehicles employing baseband radar principles in which signals with duration in the order of nanoseconds are transmitted down track along a surface wave transmission line. Reflections from a passive target located on the preceding vehicle are processed to establish the distance between the vehicles to within an accuracy previously unachievable.

6 Claims, 2 Drawing Figures

U.S. Patent  Mar. 3, 1981  4,254,418

COLLISION AVOIDANCE SYSTEM USING SHORT PULSE SIGNAL REFLECTOMETRY

BACKGROUND OF THE INVENTION

1. Field of the Invention

The invention pertains to vehicle safety apparatus and more particularly concerns means for utilizing short duration signals to determine the range between a protected vehicle and the forward object which may be a preceding vehicle.

2. Description of the Prior Art

In mass transit systems, a need exists for automatically determining the distance between one vehicle and another. One early signal system, that is still widely employed, is the fixed block system, in which the right-of-way is divided into a series of blocks. The presence of a vehicle in the block creates a response that causes a stop signal to appear at a selected number of blocks to the rear of the vehicle, and a warning signal to appear at a selected number of blocks to the rear of the stop signal. Block sizes and block intervals between signals, for safe operation of the transit system, are functions of the maximum speed capability of the vehicles employed therein, increasing as this speed capability increases. These systems are inflexible, are limited in vehicle capacity and require excessive capital expenditures when utilized in high speed mass transit systems.

Moving block systems have been developed to minimize cost, increase system flexibility, and increase system vehicle capacity. In these systems, relative distance and speed between vehicles are determined with electromagnetic equipment located at a forward position in each vehicle. Transmitted electromagnetic signals propagate along a transmission line, which may comprise the tracks of the mass transit system, until reflected from an obstacle along the right-of-way. The reflected signal is processed to determine the relative distance and speed between the obstacle and the vehicle. These systems employ conventional means for measuring distance electromagnetically and are therefore limited with respect to the minimum distance that may be determined. This minimum distance limitation prescribes the maximum speed of a vehicle in a transit system and also restricts vehicle utilization of the right-of-way.

It is an object of the present invention to provide an electromagnetic distance measuring system, which may be utilized in mass transit systems, that is capable of measuring the relative distance and speed between a vehicle and an obstacle accurately, flexibly, and inexpensively.

SUMMARY OF THE INVENTION

An electromagnetic distance measuring system for use in vehicle collision avoidance embodying the principles of the present invention employs signals in the order of nanosecond and sub-nanosecond duration which are directionally launched on a surface wave transmission line to propagate along the right-of-way forward of the vehicle. A passive target, in close proximity to the surface wave transmission line and mounted on a forward vehicle, reflects a signal back along the surface wave transmission line toward the collision avoidance system on the rearward vehicle whereat it is detected and processed to measure range with a resolution which is in the order of feet.

DESCRIPTION OF THE PREFERRED EMBODIMENT

Figure 1:
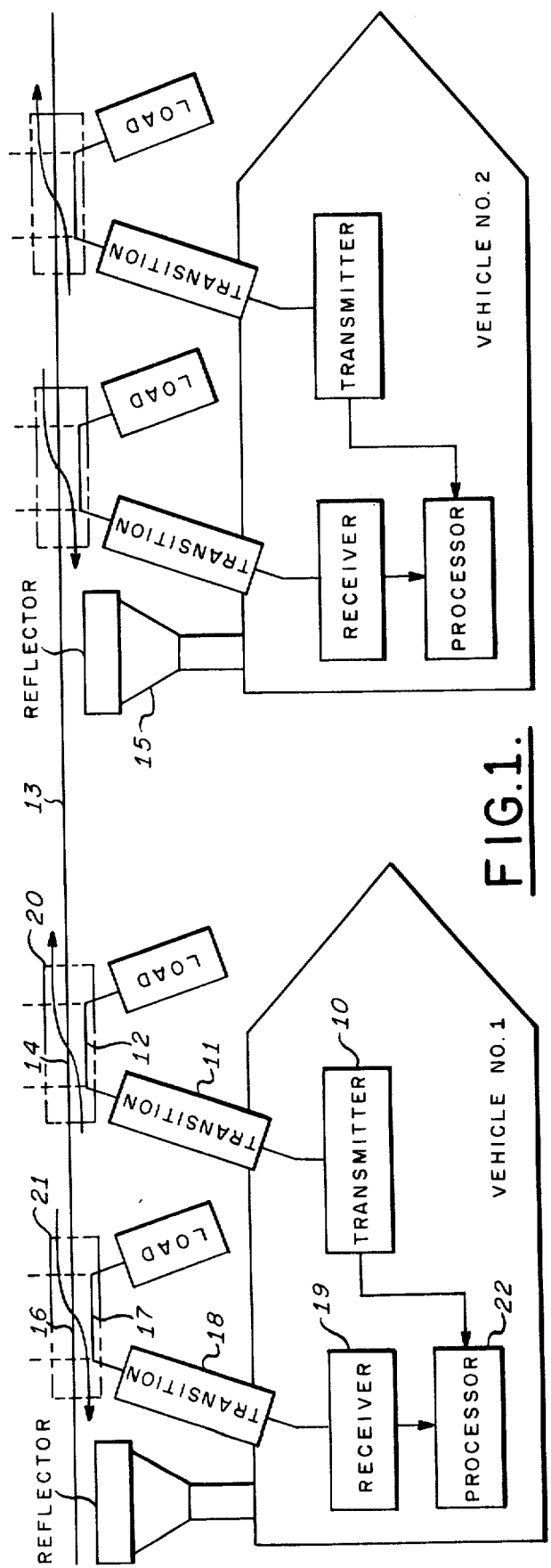
FIG. 1 is a block diagram representation of a preferred embodiment of the invention.

FIG. 1 is a block diagram representation of a collision avoidance system in accordance with the present invention. Each vehicle, shown in FIG. 1, contains a short pulse receiver, a short pulse transmitter, couplers and a reflector. The surface wave guiding structure is positioned along the right-of-way adjacent to each vehicle. In operation, transmitter 10 on vehicle number 1 generates a short pulse signal that is coupled through a transition 11 to a surface wave guiding structure 12. The surface wave guiding structure 12 is within coupling proximity of the surface wave guiding structure 13 positioned along the right-of-way. Surface wave guiding structure 12 and the section 14 of surface wave guiding structure 13 immediately adjacent thereto form a coupler 20 through which short pulse signals are coupled from transmitter 10 to the surface waveguide structure 13. Short pulse signals so coupled propagate along the surface wave guiding structure 13 until they encounter an obstacle along the line, which may be a reflector 15 positioned at the rear of vehicle number 2 which is down track from vehicle number 1. Reflector 15 is positioned to be in sufficiently close proximity to surface wave guiding structure 13 so as to cause a reflection up track along surface wave guiding structure 13. A section 16 of surface wave guiding structure 13, forms a coupler 21 with a surface wave guiding structure 17 which couples, through a transition unit 18, to a receiver 19. Surface wave guiding structure 17, transition 18 and receiver 19 being rigidly positioned with respect to vehicle number 1. Although a transmit coupler 20 and a receive coupler 21 are shown in FIG. 1, it will be apparent to those skilled in the art that a single coupler may be phased by the transmitter 10 and the receiver 19 with appropriate duplexing circuitry.

Surface wave guiding structure 13 may comprise a copper wire, the surface of which is coated with a dielectric material or modified in a manner such as threading the surface thereof. Such a surface waveguide is described in U.S. Pat. No. 2,685,068, issued July 27, 1954 to Goubau. The transmit coupler formed by section 14 and surface wave guiding structure 12 and the receive coupler formed by section 16 and the surface wave guiding structure 17 may be constructed by selecting the length of the branch guides 12 and 17 which are parallel to the main surface waveguide 13 to be at least equal to the transit length along the transmission lines of the pulse generated by transmitter 10. These branch guides are located on each vehicle in an energy coupling relationship with, and may be of the same construction as, the surface waveguiding structure 13. In one configuration, it may comprise a number 12 wire with a four mil dielectric coating and located on the vehicle to be approximately one inch from the main surface wave guiding structure 13. Short pulse signal generator 10, which couples to the transmit coupler 20, may be of the type generally known in the art and described by Ross et al in U.S. Pat. No. 3,612,899 entitled "Generator for Short Duration High Frequency Signals" issued Oct. 12, 1971, while the receiver 19, which couples to the receive coupler 21, may be of the type described by Ross in U.S. Pat. No. 3,971,990 issued July 27, 1976, both patents being assigned to the same assignee as is the present invention. Transition units 11 and 18 through which a short pulse which may be of 5 nanosecond or sub-nanosecond duration is coupled from the transmitter to the surface wave guiding structure 12 and from the surface wave guiding structure 17 to the receiver 19, respectively, may be of the general kind described by Goubau in the aforementioned patent and by Ross in U.S. Pat. No. 3,995,212 issued Nov. 30, 1976 and assigned to the assignee of the present invention. Reflector 15 may be the vehicle itself, a metal block adjacent to the surface waveguiding structure 13, or a "U" block enclosing it on three sides.

Figure 2:
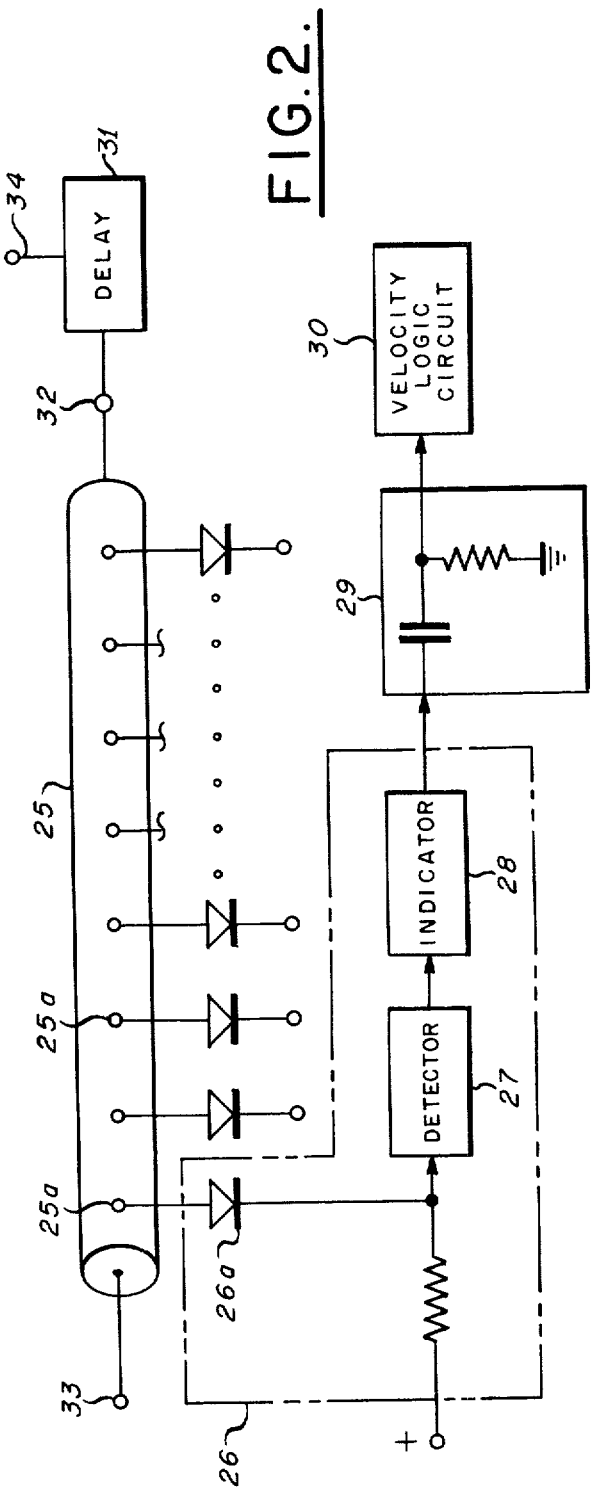
FIG. 2 is a schematic diagram partially in block form, of a processor suitable for use with the invention.

Distance and relative speeds between vehicles are determined from the time delays between transmitted and received short pulse signals. Receiver 19 couples a short pulse which is representative of the short pulse signal received to a processor 22, which has also received a short pulse from the transmitter 10 at the time of the original pulse transmission. Processor 22 may be of the type shown in FIG. 2 which comprises a uniformly tapped delay line 25, the electrical spacing of the taps being substantially equal to a distance measurement increment; a coincidence detector 26 coupled to each tap which may comprise a biased diode 26a, a pulse detector 27 coupled to the biased diode, and an incident indicator 28 coupled to the pulse detector; a differentiator 29; a velocity logic circuit 30; and a pulse delay circuit 31, the output terminal of which couples to an input terminal 32 of the tapped transmission line 25. Pulses representative of the received reflected pulses are coupled from the receiver 19 to a second input terminal 33 to the tapped transmission line 25 and pulses representative of the original transmitted pulse are coupled to the input terminal 34 of the pulse delay circuit 31.

A complete description of the tapped delay line range measurement procedure is given by Ross et al in U.S. Pat. No. 3,979,749 issued Sept. 7, 1976 and assigned to the assignee of the present invention. Briefly stated, when the two pulses coupled to the input terminals 32 and 33, coalesce at one of the taps 25a on the transmission line 25, the threshold at the diode 26a of the coincidence detector 26 is exceeded and a pulse is coupled to pulse detector 27 which in turn triggers the indicator 28. If the transmission line is L units long and has a propagation velocity V units/second, a delay t = L/V would represent a complete transit of a pulse across the transmission line. Setting delays in the delay circuit 31 that are integral multiplies of t constitutes a coarse range setting, with the fine range measurement accomplished by the detection of the pulse coalescence at the taps 25a.

As the distance between the vehicle changes, coalescence of the two pulses coupled from the opposite ends of the line will be removed from the tap corresponding to the initial distance and occur at a tap which corresponds to the new distance between the vehicles. The rate at which the coalesced pulse detection moves from tap to tap is a function of the relative speed of the vehicles. When two pulses coalesce at a tap, the indicator 28 coupled thereto supplies a constant level signal to the corresponding differentiator 29. As the distance between the vehicles change, the pulses coalesce at a different tap and the constant level signal at the differentiator abruptly changes, causing a pulse to be coupled from the differentiator 29 to the velocity logic circuit 30 wherein the rate of reception of these pulses is measured and the relative speed between the vehicles is determined.

While the invention has been described in its preferred embodiments, it is to be understood that the words which have been used are words of description rather than limitation and that changes may be made within the purview of the appended claims without departing from the true scope and spirit of the invention in its broader aspects.

What is claimed is:

1. A collision avoidance system for a vehicle travelling a prescribed route with a wave guiding structure extending therealong comprising:
    means on said vehicle and coupled to said wave guiding structure for transmitting short pulse signals;
    means on said vehicle and coupled to said wave guiding structure for receiving short pulses reflected from an obstacle preceding said vehicle and for providing at an output terminal thereof short pulse signals representative of said received reflected short pulses;
    a transmission line coupled at one end to said transmitting means and at the other end to said output terminal of said receiver means, said transmission line having taps thereon with electrical spacings therebetween which are substantially equal to a distant measurement increment; and
    means coupled to said taps for determining and indicating a tap at which a short pulse coupled to said one end and a short pulse coupled to said other end coincide, whereby the distance between said vehicle and said obstacle is determined by noting said coincidence tap for said short pulses coupled from either end of said transmission line.

2. A collision avoidance system in accordance with claim 1 further including:
    means coupled to said coincidence determining and indicating means for differentiating pulses at said taps formed by said pulse coalescence; and
    means coupled to receive said differentiated pulses for determining the relative speed between said vehicle and said obstacle.

3. Collision avoidance system in accordance with claims 1 or 2 further including delay means coupled between said transmitter therefor means and said second input terminal of said transmission line for delaying pulses from said generator means prior to coupling to said second input terminal.

4. Collision avoidance system in accordance with claim 1 or 2 wherein said short pulse signals are of sub-nanosecond duration.

5. A collision avoidance system in accordance with claims 1 or 2 wherein said wave guiding structure is a surface wave transmission line on which short pulses of subnanosecond and nanosecond duration may propagate.

6. A collision avoidance system in accordance with claims 1 or 2 wherein said short pulse is of substantially nanosecond duration.

* * * * *